INVENTOR
Eugene V. Horanoff

United States Patent Office
3,552,201
Patented Jan. 5, 1971

3,552,201
WINDTUNNEL ROLL-MOMENT BALANCE
Eugene V. Horanoff, Clarksville, Md., assignor to the United States of America as represented by the Secretary of the Navy
Filed Oct. 11, 1968, Ser. No. 766,890
Int. Cl. G01m 9/00
U.S. Cl. 73—147    4 Claims

ABSTRACT OF THE DISCLOSURE

A windtunnel roll-moment balance having an elongated cylindrical support for an aerodynamic body connected to a sting by a pair of diametrically opposed roll flexures and eight symmetrically disposed flexures which permit the roll flexures to deflect in response to a rolling moment while preventing the roll flexures from deflection in response to pitch and yaw forces.

BACKGROUND OF THE INVENTION

The present invention relates generally to windtunnel balances, and more particularly to a windtunnel balance for sensing of rolling moment caused by the wind force acting externally on an aerodynamic object undergoing windtunnel testing.

In windtunnel experimentation it is desirable to have a balance device which is responsive to drag and yaw forces as well as pitching and yawing moments. Several types of roll-moment balances have been devised in the past for this purpose, these devices are of heavy cruciform construction and although satisfactory for measuring heavy rolling have not been sufficiently sensitive to measure small rolling. Furthermore, the prior art devices do not readily lend themselves to being made sensitive enough to measure small rolling moments, since they must retain sufficient rigidity to overcome the effects of pitch and yaw loads.

SUMMARY OF THE INVENTION

Accordingly, one object of this invention is to provide a new and improved windtunnel balance for measurement of forces resulting in a roll moment acting externally on an aerodynamic body.

Another object of the invention is the provision of a new and improved windtunnel balance which readily responds to an applied rolling moment and will readily resist other forces and moments applied thereto.

A further object of the instant invention is to provide a new and improved windtunnel balance sensitive to small rolling moment, and insensitive to the effects of pitch and yaw loads.

Briefly, in accordance with one embodiment of this invention, these and other objects are attained by providing a windtunnel balance for observing a rolling moment around the longitudinal axis of an aerodynamic test body having an elongated cylindrical element for supporting the body, an elongated cylindrical sting longitudinally aligned with the elongate supporting element and spaced therefrom, a pair of diametrically opposed roll flexures connecting the supporting element and the sting and capable of deflection in response to a rolling moment, a plurality of symmetrically disposed flexures connecting the supporting elements and the sting and capable of preventing the roll flexures from deflection in response to pitch and yaw forces, and a pair of strain gages secured to opposed surfaces of each of the roll flexures and yieldable in proportion to the magnitude and direction of distortion of the roll flexures in response to the rolling moments.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
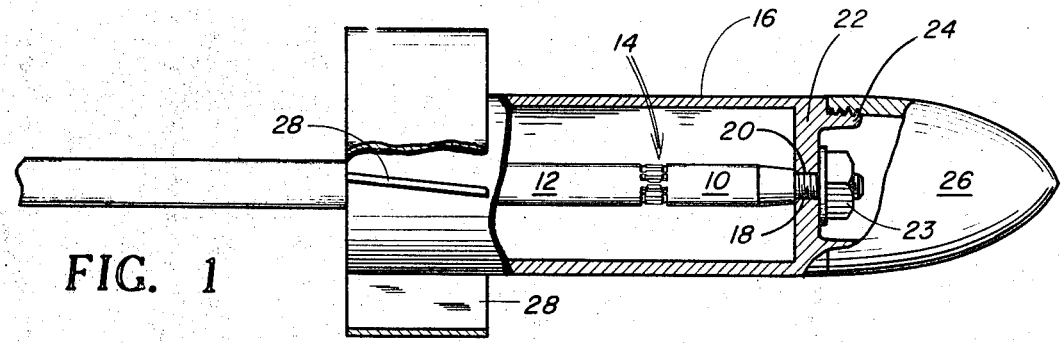
FIG. 1 is a view of the balance constructed in accordance with the present invention illustrating a test model attached thereto with the model partially broken away and partially in section.

Referring now to the drawings wherein like reference characters designate identical or corresponding parts throughout the several views, and more particularly to FIG. 1 thereof wherein the windtunnel balance of the present invention is shown as consisting of an elongated cylindrical model supporting element 10 connected to a sting 12 by means of a flexure assembly 14 to be described more fully hereinafter. An aerodynamic model 16 is mounted about support 10 by conventional means such as a threaded elongate member 18 passing through an aperture 20 formed in an internal wall member 22 of the model which coacts with a nut 23. Model 16 has a forwardly dependent externally threaded flange member 24 onto which may be secured a model nose portion 26 having an internally threaded portion engaging with the externally threaded member 24. A canted fin assembly 28 is provided on the aft end of model 16 such that air flow along the longitudinal axis of model 16 will tend to cause the model to rotate as the air impinges upon the canted fins 28.

Figure 2:
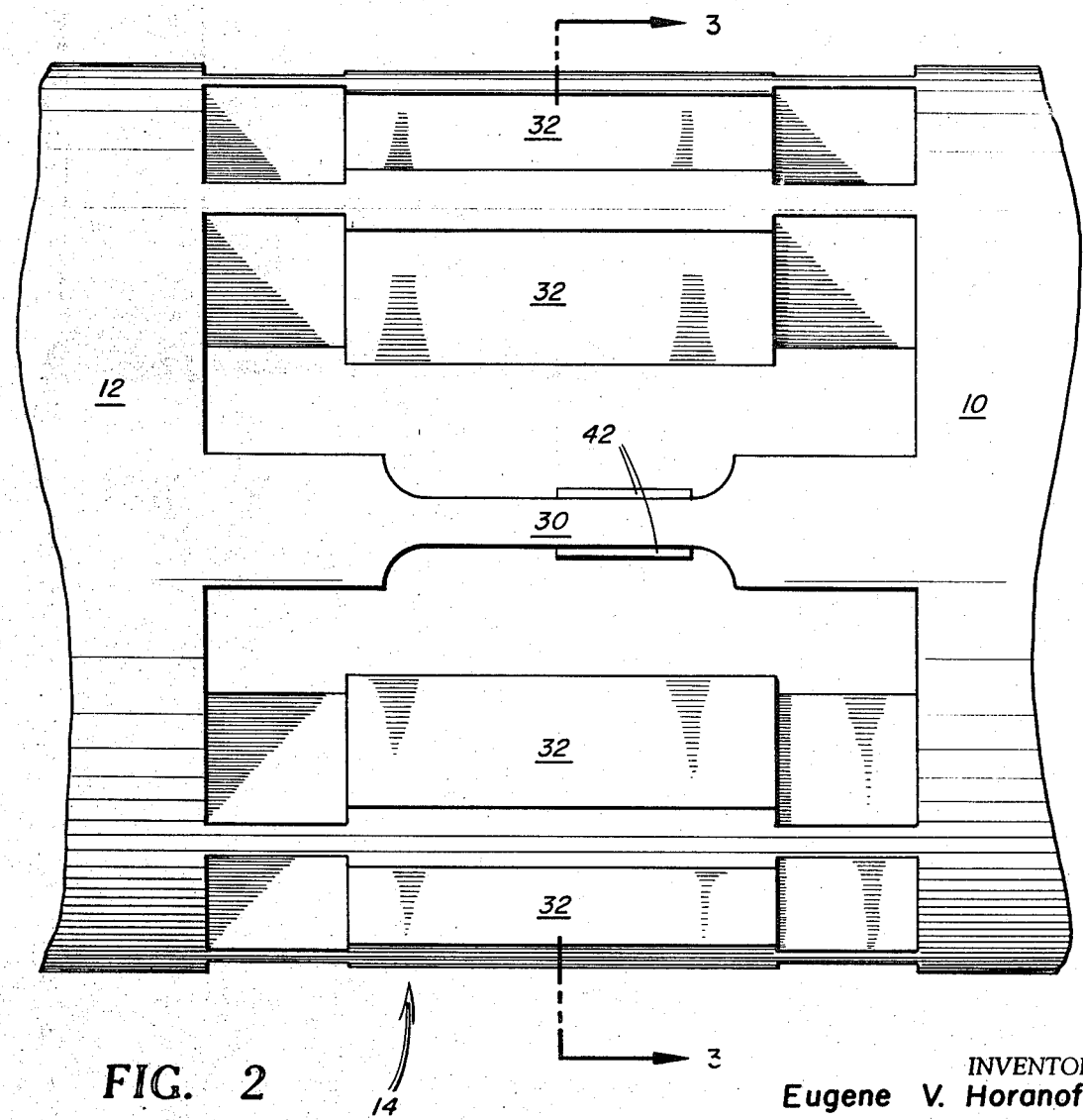
FIG. 2 is a fragmentary enlarged side view illustrating the flexures connecting the model support and the sting.
Figure 3:
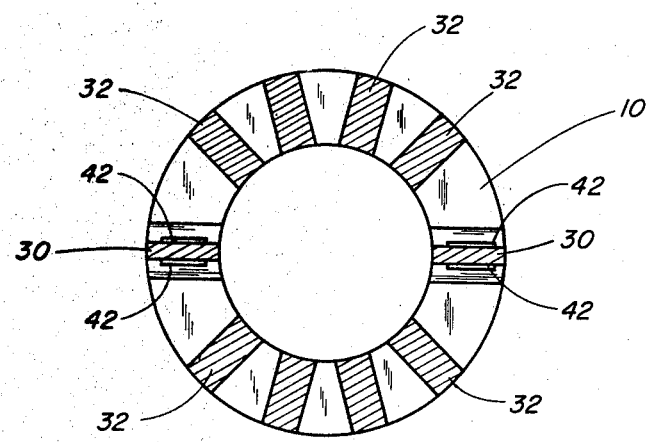
FIG. 3 is a sectional view taken along the line 3—3 of FIG. 2.
Figure 4:
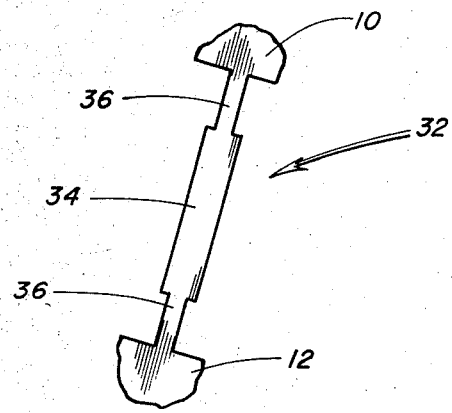
FIG. 4 is a fragmentary plan view of a support flexure.

Referring now to FIGS. 2 and 3 flexure assembly 14 is shown as made up of a pair of diametrically opposed elongated roll flexures 30 and eight symmetrically disposed elongate support flexures 32 arranged in a cylindrical array. The flexures are of a generally rectangular cross sectional configuration. The support flexures 32, as shown more clearly in FIG. 4, are formed of a heavy columnar central portion 34 and integral end portions 36 of substantially reduced cross-section. The rigidity of the heavy central portion 34 offers increased resistance to buckling from the effects of pitch and yaw forces on the model while the end portions 36 permit the flexures 32 to twist such that roll moments may be experienced by the balance.

Figure 5:
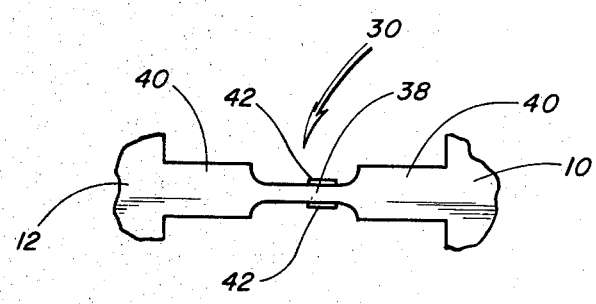
FIG. 5 is a fragmentary plan view of a roll flexure.

As shown in FIG. 5, each of the roll flexures 30 are constructed in the form of a columnar member having a central portion 38 of substantially reduced cross-section supported between integrally formed heavy end members 40. Due to the flexible and resilient nature of portions 38, the roll flexures will experience substantial deflection in response to a rolling moment applied to the model 16 when under wind tunnel test conditions. Electrical strain gages 42 are bonded to each of the flat surfaces of the central portion 38 off-center thereof to provide a resistive impedance variation proportional to the magnitude and direction of distortion of the roll flexures in response to the rolling moment.

Although the most accurate data may be obtained from a balance device wherein the support 10, sting 12 and flexure assembly 14 are integral, as shown in the drawings, it is within the scope of the present invention that the various elements can be fabricated individually and subsequently assembled into the configuration shown in FIG. 2.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A wind tunnel balance for observing a rolling moment around the longitudinal axis of an aerodynamic body comprising an elongated cylindrical element for supporting said body, an elongated cylindrical sting longitudinally aligned with said supporting element and spaced therefrom, at least one pair of diametrically opposed roll flexures intermediate of said supporting element and said sting and capable of deflection in response to a rolling moment, a plurality of symmetrically disposed flexures intermediate of said supporting element and said sting and capable of preventing said roll flexures from deflection in response to pitch and yaw forces, each of said symmetrically disposed flexures having a heavy central columnar portion and end portions of substantially reduced cross-section, and means responsive to the deflection of said roll flexures for indicating the magnitude and direction of said rolling moments.

2. The wind tunnel balance as defined in claim 1 wherein said roll flexures and said symmetrically disposed flexures are arranged in a cylindrical array.

3. The wind tunnel balance as defined in claim 1 wherein each of said roll flexures comprises a columnar member having a central portion of substantially reduced cross-section.

4. The wind tunnel balance as defined in claim 3 wherein said means responsive to the deflection of said roll flexures includes a pair of strain gages secured to opposed sides of the reduced cross-section portion of at least one of said roll flexures at positions longitudinally spaced from the centers of said reduced cross-section portions.

References Cited
UNITED STATES PATENTS

| | | | |
|---|---|---|---|
| 2,768,526 | 10/1956 | Trimble | 73—147 |
| 2,865,200 | 12/1956 | Geiseler | 73—147 |

S. CLEMENT SWISHER, Primary Examiner